(12) United States Patent
Bandini et al.

(10) Patent No.: US 10,302,214 B2
(45) Date of Patent: May 28, 2019

(54) FLOW CONTROL VALVE FOR FILLING MACHINE

(71) Applicant: SIDEL PARTICIPATIONS S.A.S., Octeville-sur-Mer (FR)

(72) Inventors: Filippo Bandini, Parma (IT); Luca Ferrari, Parma (IT)

(73) Assignee: SIDEL PARTICIPATIONS S.A.S., Octeville sur-Mer (FR)

( * ) Notice: Subject to any disclaimer, the term of this patent is extended or adjusted under 35 U.S.C. 154(b) by 23 days.

(21) Appl. No.: 15/343,812

(22) Filed: Nov. 4, 2016

(65) Prior Publication Data
US 2017/0130860 A1 May 11, 2017

(30) Foreign Application Priority Data
Nov. 6, 2015 (EP) .................................... 15306764

(51) Int. Cl.
*B67C 3/28* (2006.01)
*B65B 39/00* (2006.01)
*F16K 31/08* (2006.01)

(52) U.S. Cl.
CPC .......... *F16K 31/086* (2013.01); *B65B 39/004* (2013.01); *B67C 3/28* (2013.01); *B67C 3/281* (2013.01)

(58) Field of Classification Search
CPC .............................. F16K 31/086; B67C 3/281
(Continued)

(56) References Cited

U.S. PATENT DOCUMENTS 4,948,091 A * 8/1990 Satoh ...................... F16K 1/12
251/129.11
5,069,239 A * 12/1991 Bunce .................. F16K 31/086
137/15.04
(Continued)

FOREIGN PATENT DOCUMENTS

WO   WO 2011/045023 A1   4/2011
WO   WO 2013/057695 A1   4/2013

OTHER PUBLICATIONS

Extended European Search Report issued by the European Patent Office in counterpart European Patent Application No. 15306764.0, dated Apr. 19, 2016.

*Primary Examiner* — Jason K Niesz
*Assistant Examiner* — James R Hakomaki
(74) *Attorney, Agent, or Firm* — Finnegan, Henderson, Farabow, Garrett & Dunner LLP

(57) ABSTRACT

A flow control valve for a filling machine configured to fill receptacles with a pourable product, the flow control valve comprising: a tubular body defining a channel for the pourable product, the tubular body having a longitudinal axis and terminating with at least one narrowed end mouth; and a shutter movable within the channel between a closed position, and an open position. The shutter includes a main portion coupled in a sliding manner with an inner surface of the tubular body; and a narrowed closing head, wherein the main portion of the shutter includes a flat plate extending along a diameter of the channel with respect to the longitudinal axis, contacting the inner surface of the tubular body at opposite sides and defining, with the remaining portions of the inner surface, two opposite cavities, which have respective profiles shaped as circular segments and through which the pourable product can flow during operation.

15 Claims, 4 Drawing Sheets

(58) Field of Classification Search
USPC .................................................. 141/392, 301
See application file for complete search history.

(56) References Cited

U.S. PATENT DOCUMENTS

| | | | | |
|---|---|---|---|---|
| 5,213,307 | A * | 5/1993 | Perrillat-Amede | F16K 31/088 251/65 |
| 5,450,877 | A * | 9/1995 | Graffin | F16K 31/086 137/630.14 |
| 5,676,344 | A * | 10/1997 | Graffin | B65B 39/004 251/65 |
| 5,687,779 | A | 11/1997 | Andersson | |
| 6,375,050 | B1 * | 4/2002 | Gruson | B67C 3/2608 137/614.11 |
| 6,546,970 | B2 * | 4/2003 | Gatteschi | B65B 39/004 141/100 |
| 6,810,931 | B2 * | 11/2004 | Graffin | B67C 3/26 141/301 |
| 7,717,396 | B2 * | 5/2010 | Graffin | H01F 7/0242 251/65 |
| 2002/0017324 | A1 * | 2/2002 | Hisamura | B67C 3/28 137/554 |
| 2006/0261300 | A1 * | 11/2006 | Merabet | F16K 31/086 251/65 |
| 2008/0211323 | A1 * | 9/2008 | Graffin | F16K 31/086 310/12.25 |
| 2008/0265189 | A1 * | 10/2008 | Bravo | F16K 31/086 251/63.5 |
| 2011/0088813 | A1 * | 4/2011 | Graffin | B65B 39/004 141/301 |
| 2017/0050753 | A1 * | 2/2017 | Glock | B65B 39/004 |

* cited by examiner

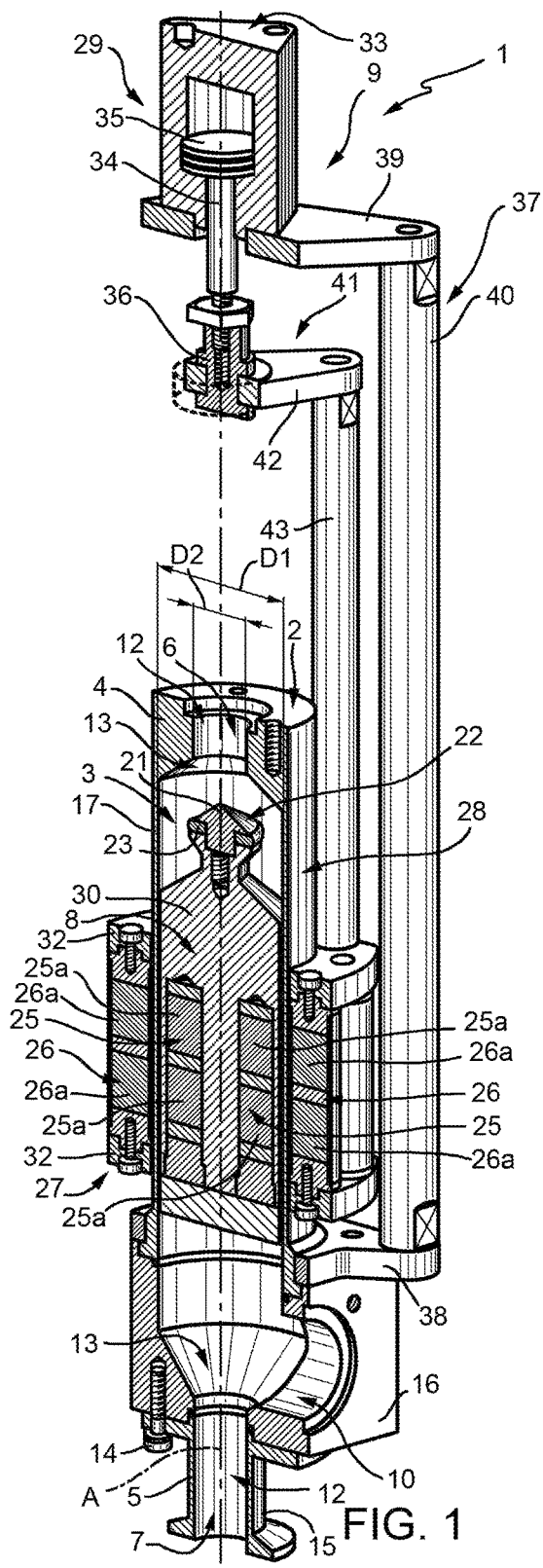
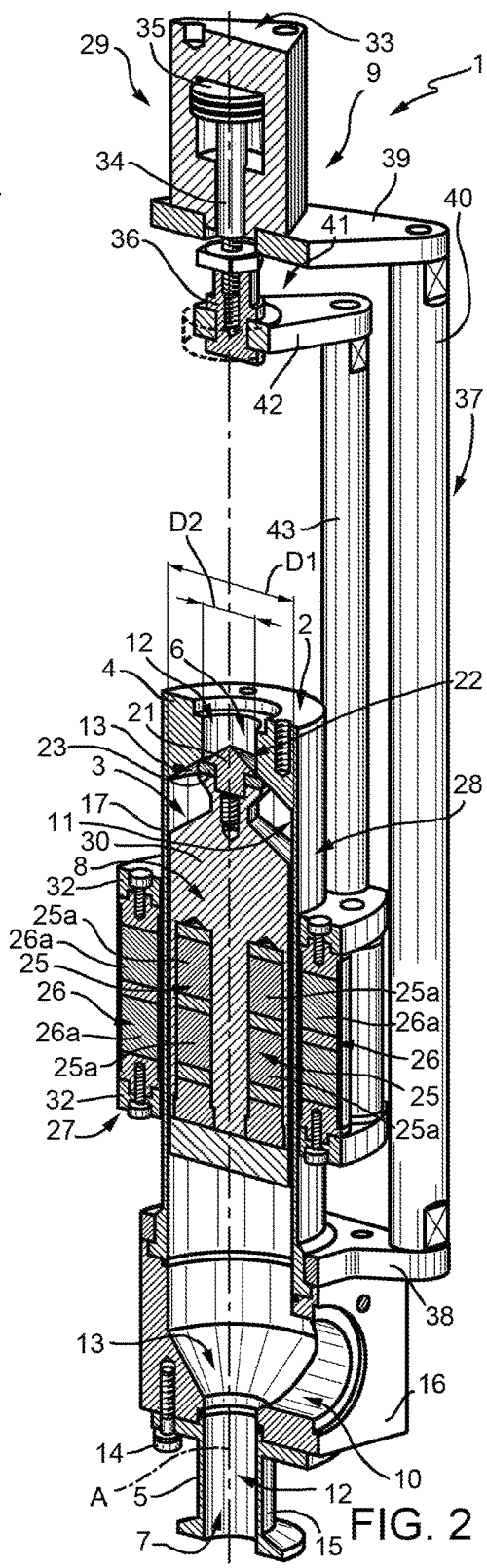
FIG. 1
FIG. 2

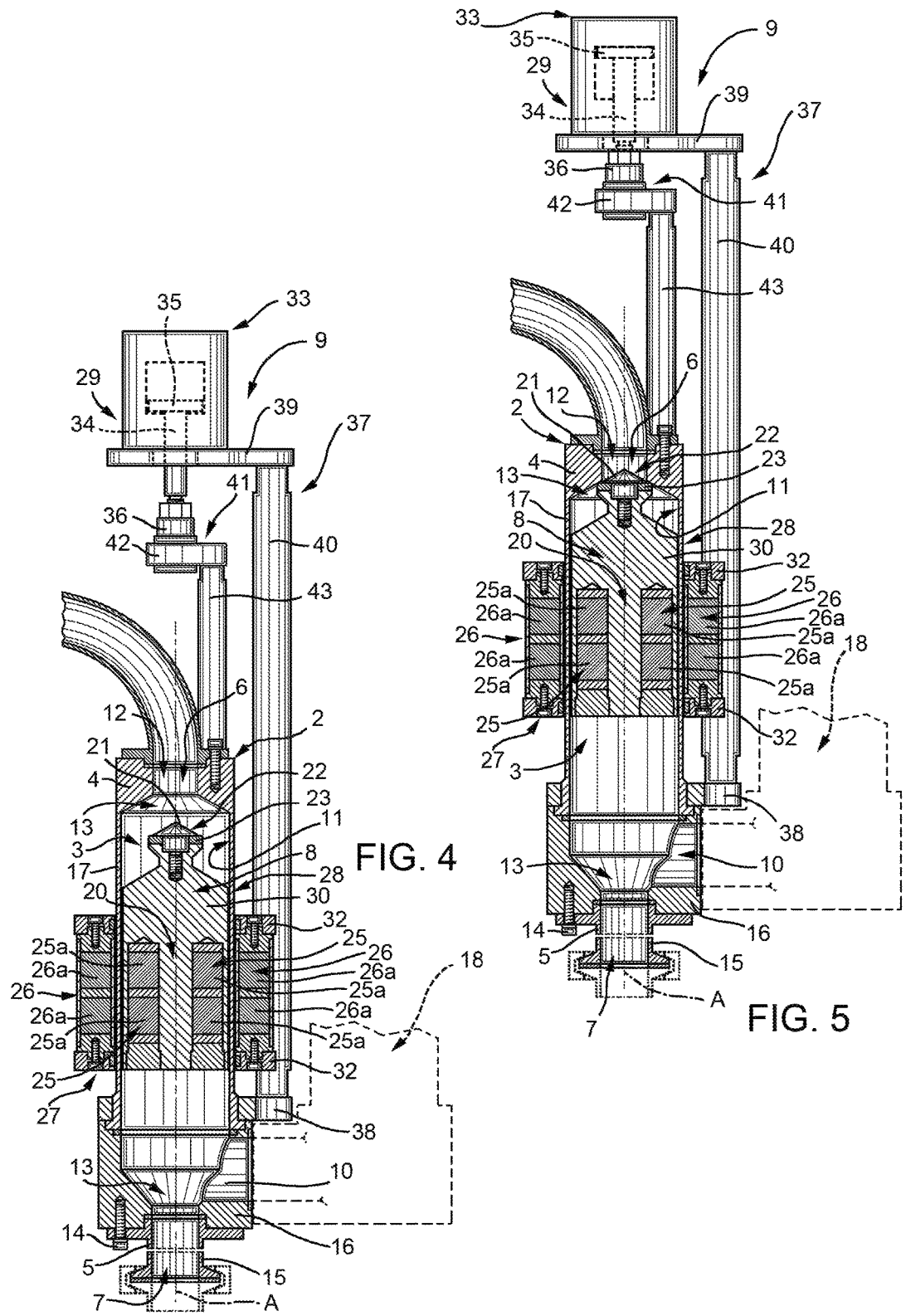

FLOW CONTROL VALVE FOR FILLING MACHINE

CROSS-REFERENCE TO RELATED APPLICATIONS

This application claims the benefit of priority of European Patent Application No. 15306764.0, filed on Nov. 6, 2015, which is incorporated herein by reference.

TECHNICAL FIELD

The present invention relates to a flow control valve, preferably a filling or batcher valve, for a filling machine apt to fill receptacles with a pourable product, in particular a pourable product including solid particles suspended in a liquid phase, such as soft drinks or beverages containing fruit bits, fruit fibers and fruit sacs.

In addition, the present invention relates to a flow control valve suitable for operating in aseptic or ultra clean conditions.

BACKGROUND ART

As known, there is an increasing demand from the market for soft drinks or beverages containing fruit particles or pieces, such as soft fruit bits, normally available in cubes or slices, fruit fibers, containing large portions of fruit cellulose, and fruit sacs, i.e. intact "pouch-like" structures of a citrus fruit, filled with or without liquid.

These kinds of beverages are normally stored in tanks before being delivered to the filling machines and then closed and sealed into receptacles for retail.

In order to prevent the deterioration and the degradation by microbial contamination of the pourable products and to prolong the maximum preservation times, it is often necessary to use filling machines which fill the receptacles in aseptic or ultra-clean conditions.

In general, such a filling machine is fed with aseptic or ultra-clean receptacles (for example receptacles which have previously been sterilised) and is adapted to provide receptacles filled with a sterilised product in aseptic or ultra-clean conditions.

A commonly-known filling machine basically comprises a carousel conveyor rotating about a rotation axis, a tank containing the product, and a plurality of filling units which are selectively connected with the tank and are supported by the carousel conveyor in a radially external position with respect to the rotation axis of the carousel conveyor itself.

In one possible solution, each filling unit comprises a filling valve adapted to feed the pourable product to a respective receptacle, a batcher valve interposed between the tank and the filling valve and connected to the latter through an intermediate conduit, and a dosing actuator connected to the intermediate conduit in a position interposed between the batcher valve and the filling valve.

With this type of filling unit, the filling of each receptacle is carried out in two steps.

First, the filling valve is set in a closed configuration, the batcher valve is opened and the dosing actuator is activated to suck the pourable product from the tank via the batcher valve up to reach a desired volume.

At this point, the batcher valve is closed, the filling valve is opened and the dosing actuator feeds the volume of product previously formed to the respective receptacle.

In another possible solution, each filling unit only comprises a filling valve directly connecting the tank with the receptacle to fill. In this case, dosage of the pourable product is done on the basis of the time during which the filling valve is maintained open.

In both cases, each of the above-mentioned filling and batcher valves basically comprises:

a tubular body defining a flowing channel for the pourable product and terminating with at least one narrowed end mouth; and a shutter movably sliding within the flowing channel between a closed position, in which the shutter sealingly closes the narrowed end mouth and interrupts the flow of the pourable product, and an open position, in which a gap is established between the shutter and the narrowed end mouth so as to allow free flow of the pourable product through such narrowed end mouth.

In order to avoid any risk of external contamination, the movements of the shutter within the flowing channel are magnetically controlled. In practice, the shutter is magnetically coupled to a driving actuator arranged completely external to the tubular body. More specifically, the driving actuator is provided with one or more permanent magnets and is mounted onto the outer surface of the tubular body in a sliding manner; in a completely equivalent manner, the shutter is provided with one or more permanent magnets facing the respective permanent magnets of the driving actuator and magnetically attracted by the latter through the lateral wall of the tubular body. In this way, any axial displacement of the driving actuator produces a corresponding axial movement of the shutter.

This type of solution is disclosed for instance in WO 2013/057695 in the name of the same applicant.

In this case, the shutter comprises a substantially cylindrical main portion, sliding within the tubular body, and a closing head adapted to sealingly engage the narrowed end mouth of the tubular body in the closed position of the shutter itself.

More specifically, the main portion of the shutter integrally comprises a central cylindrical body, provided with the permanent magnets and housed with a radial gap within the tubular body, and a plurality of protrusions, projecting radially from the cylindrical body at different axial heights thereof and sliding in use along the inner surface of the tubular body itself.

In practice, the annular space between the cylindrical body of the shutter and the tubular body defines the passage for the pourable product with the solid particles; the radial projections of the shutter are so shaped and positioned to not hamper the flow of the particles.

This recently-proposed solution still leaves room for further improvements, especially as to achieve a further increase of the product passage section between the tubular body and the shutter of the valve without reducing the force of magnetic attraction between the driving actuator and the shutter itself.

DISCLOSURE OF INVENTION

It is therefore an object of the present invention to provide a flow control valve for a filling machine, which is designed to meet the above need, and which is cheap and easy to implement.

According to the present invention, there is provided a flow control valve as claimed in claim 1.

BRIEF DESCRIPTION OF THE DRAWINGS

A preferred embodiment is hereinafter disclosed for a better understanding of the present invention, by mere way of non-limitative example and with reference to the accompanying drawings, in which:

FIG. 1 shows a partially sectioned perspective view of a flow control valve according to the present invention, in an open position and with parts removed for clarity;

FIG. 2 shows a partially sectioned perspective view of the flow control valve of FIG. 1, in a closed position and with parts removed for clarity;

FIG. 4 shows a smaller-scale axial section of the flow control valve of FIG. 1;

FIG. 5 shows a smaller-scale axial section of the flow control valve of FIG. 2.

BEST MODE FOR CARRYING OUT THE INVENTION

Figure 3:
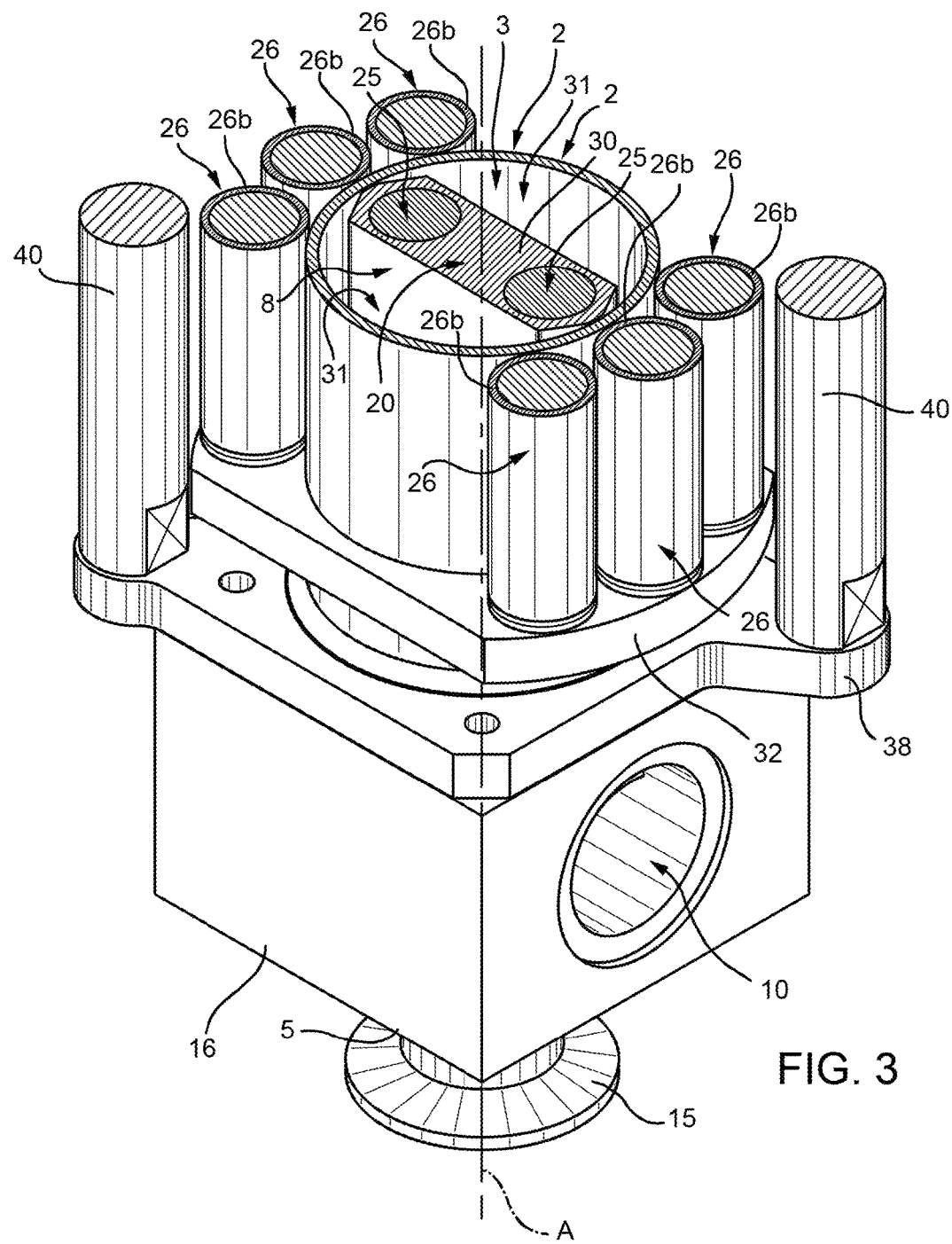
FIG. 3 shows a larger-scale, partially sectioned perspective view of a detail of FIGS. 1 and 2.
Figure 6:
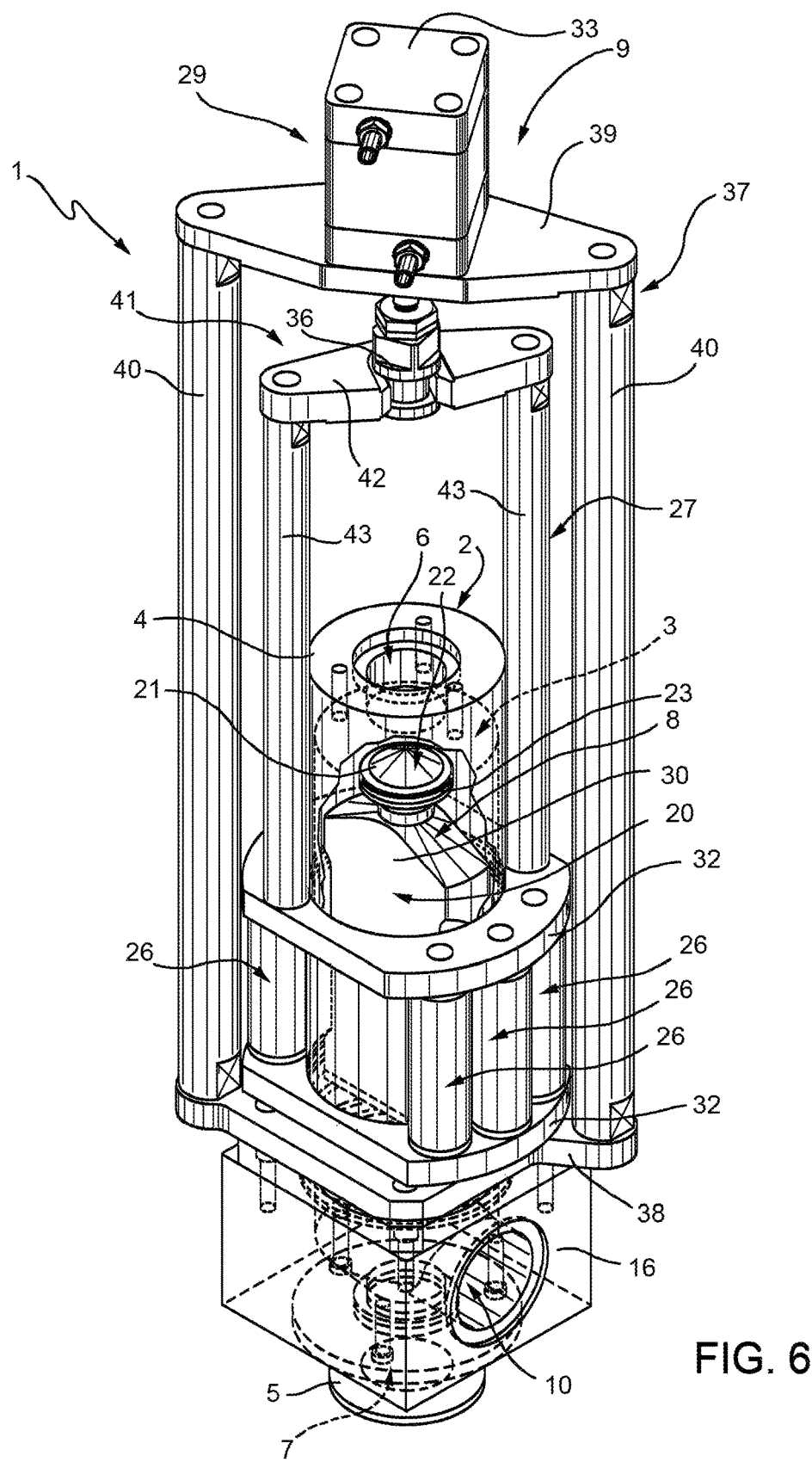
FIG. 6 shows another perspective view of the flow control valve of FIG. 1.

Number 1 in FIGS. 1 to 6 indicates as a whole a flow control valve according to the present invention, which is adapted to be incorporated in a filling machine in aseptic or ultra-clean conditions (known per se and not shown) for filling receptacles (also known per se and not shown) with a pourable product.

In particular, valve 1 disclosed herein is suitable to be used during filling operations which imply a pourable product of the type comprising suspended solid particles in a liquid phase, as for example fruit juices containing fibres and pieces of fruit, or beverages containing milk in turn containing pieces of fruit or the like. Typically, these are products comprising an aqueous liquid phase, in which average size particles having lengths up to e.g. 6-12 mm or even larger are suspended.

This filling machine is typically fed with sterilised empty receptacles and fills the latter with the pourable product in aseptic conditions. For this purpose, the filling machine typically comprises a tank containing the product, a carousel conveyor rotating about a vertical axis and protrudingly bearing on its peripheral portion a plurality of filling units (known per se and not shown) for filling respective receptacles during rotation of the carousel conveyor itself. In particular, each filling unit comprises support means, adapted to support one respective receptacle, and one or more valves 1 for filling such receptacle and/or for dosing the pourable product to be fed into the receptacle itself.

With reference to the enclosed. Figures, valve 1 basically comprises:
  a tubular body 2 of axis A, defining a flowing channel 3 for the pourable product and having opposite end portions 4, 5 delimiting corresponding narrowed end mouths 6, 7 adapted to be respectively connected in use to the tank and to the receptacle to be filled;
  a shutter 8 housed within tubular body 2 and movable within channel 3 to allow or prevent flow of the pourable product between the end mouths 6 and 7; and
  actuating means 9 arranged completely externally to tubular body 2 and magnetically coupled to shutter 8 to move the latter within channel 3.

Preferably, axis A extends vertically and end portion 5 is arranged at a lower position than end portion 4.

In the specific non-limiting example shown in the enclosed Figures, valve 1 is a batcher valve; in this case, end portion 5 of tubular body 2 also defines an auxiliary port 10 extending radially with respect to channel 3, located upstream of end mouth 7 with respect to the flow of the pourable product towards the respective receptacle and adapted to be connected in use to a dosing actuator 18 (known per se and only partially and schematically shown in dotted lines in FIGS. 4 and 5). In practice, a desired volume of the pourable product is first sucked from the tank by the dosing actuator 18 via valve 1 and auxiliary port 10 and then fed to the respective receptacle.

As a possible alternative not shown, valve 1 may be also a filling valve lacking the auxiliary port 10 and in which one of the end mouths 6, 7 is connected to the tank and the other end mouth is used to feed the pourable product directly to the respective receptacle.

With particular reference to FIGS. 1, 2, 4 and 5, channel 3 is delimited by a cylindrical inner surface 11 of tubular body 2 and has a constant diameter D1 with respect to axis A.

End mouths 6, 7 substantially have the same configurations and each comprises a narrowed end region 12, having a constant diameter D2 smaller than D1 with respect to axis A, and a frustum-conical transition region 13, interposed between channel 3 and the adjacent narrowed end region 12 as well as tapering towards the latter.

In the example shown in the enclosed Figures, tubular body 2 is made in three parts connected to each other in a releasable way by screws 14 (only some of them shown), so as to allow assembly of the shutter 8 within channel 3. In particular, a first tubular element 15 defines narrowed end region 12 of end mouth 7, a second tubular element 16 defines transition region 13 of end mouth 7 and an adjacent portion of channel 3, and a third annular element 17 defines the remaining part of channel 3 and end mouth 6.

With reference to the enclosed Figures, shutter 8 is coaxially housed within tubular body 2 and comprises a main portion 20, sliding along inner surface 11 of the tubular body 2 itself, and a narrowed closing head 21, axially protruding from main portion 20 and configured to cooperate in a fluid-tight manner with end mouth 6.

In particular, closing head 21 terminates with a conical surface 22, which is complementary to the surface of tubular body 2 delimiting transition region 13 of end mouth 6 and is configured to cooperate in use with this latter surface to sealingly close fluidic connection of valve 1 with the tank. To this aim, closing head 21 is provided with an annular gasket 23 mounted onto conical surface 22 and directly contacting in use the surface of tubular body 2 delimiting transition region 13 of end mouth 6.

Shutter 8 is selectively moved by actuating means 9 within channel 3 of tubular body 2 between a closed position (FIGS. 2 and 5), in which the closing head 21 sealingly closes end mouth 6 and interrupts flowing of the pourable product, and an open position (FIGS. 2 and 4), in which a gap is established between the closing head 21 and end mouth 6 so as to allow free flowing of the pourable product through the end mouth 6 itself.

Main portion 20 of shutter 8 comprises a pair of permanent-magnet units 25 magnetically coupled with respective permanent-magnet units 26 of actuating means 9.

In the preferred solution shown in FIGS. 1, 2, 4 and 5, each permanent-magnet unit 25 is of the same type as the permanent-magnet unit of the shutter shown in WO 2013/057695 and comprises at least two permanent magnets 25a arranged adjacent to one another with identical magnetic poles facing axially. The permanent magnets 25a are conveniently incorporated within main portion 20 of shutter 8.

In a completely analogous way, each permanent-magnet unit 26 is preferably of the same type as the permanent-magnet units of the actuating means shown in WO 2013/057695 and comprises at least two permanent magnets 26a arranged adjacent to one another with identical magnetic poles facing axially, and oriented, with respect to the permanent magnets 25a of shutter 8, with different magnetic poles reciprocally facing radially. In particular, each permanent-magnet unit 26 also comprises a cylindrical casing 26b internally housing permanent magnets 26a.

With particular reference to FIGS. 1, 2, 4, 5 and 6, actuating means 9 comprise a magnetic movable member 27, coaxially coupled in a sliding manner onto an outer surface 28 of tubular body 2 and provided with the permanent-magnet units 26, and a driving actuator 29 for displacing movable member 27 and, through magnetic attraction, shutter 8 along axis A.

According to an important aspect of the present invention, main portion 20 of shutter 8 comprises a flat plate 30, which extends along one diameter of channel 3 with respect to axis A, carries permanent-magnet units 25 at its opposite sides contacting inner surface 11 and defines, with the remaining portions of the inner surface 11, two opposite cavities 31, which have respective profiles shaped as circular segments and through which the pourable product can flow in use.

In practice, the permanent-magnet units 25 are located at diametrically opposite positions on plate 30 of shutter 8 with respect to axis A.

In a completely analogous way, the permanent-magnet units 26 of movable member 27 are grouped in two sets, each of which facing in use one respective permanent-magnet unit 25 of plate 30 of shutter 8.

More specifically, in the example shown, each set of permanent-magnet units 26 is formed by three permanent-magnet units 26 arranged along an arc of circumference about axis A; the arcs, along which the two sets of permanent-magnet units 26 are arranged, are diametrically opposite to one another with respect to axis A.

In greater details, movable member 27 comprises two annular plates 32 spaced apart along axis A, mounted in a sliding manner onto outer surface 28 of tubular body 2 and connected to one another by permanent-magnet units 26, which in turn have elongated configurations extending parallel to axis A.

Driving actuator 29 is of fluidic type and basically comprises a fixed casing 33, externally secured onto tubular body 2, and a piston 34 having one end 35 movable within casing 33 along axis A and one opposite end 36 extending outside casing 33 and connected to movable member 27.

In particular, casing 33 is coaxial to axis A, is preferably placed at a higher position than the tubular body 2 and is secured to the tubular body 2 itself by a frame 37 projecting upwards from the latter. In greater details, frame 37 comprises a first annular horizontal plate 38 secured by screws 14 at end portion 5 of tubular body 2, a second horizontal plate 39 supporting casing 33 and spaced apart along axis A from end portion 4 of the tubular body 2 itself, and two or more uprights 40, connecting plates 38 and 39 and extending parallel to axis A.

Connection between piston 34 and movable member 27 is achieved by a further frame 41 projecting upwards from the upper annular plate 32 of movable member 27; frame 41 comprises a horizontal plate 42, protruding orthogonally from end 36 of piston 34, and two or more uprights 43 connecting plate 42 to upper plate 32 of movable member 27 and extending parallel to axis A.

In use, by the effect of magnetic coupling between movable member 27 and shutter 8, the activation of driving actuator 29—i.e., for example, the resulting translating motion of piston 34 within casing 33—conveniently determines corresponding axially directed translating motions of the movable member 27 and, by magnetic attraction, of the shutter 8 within channel 3 of tubular body 2.

In particular, if the valve 1 is used as a batcher, displacement of shutter 8 into its open position, i.e. with the closing head 21 spaced from the narrowed end mouth 6, allows free flow of the pourable product from the tank into the channel 3; in this case, the pourable product is first sucked by the dosing actuator 18 via auxiliary port 10 up to reach a desired volume and then fed to the receptacle after displacement of the shutter 8 into its closed position, i.e. with the closing head 21 cooperating in a fluid-tight manner with the transition region 13 of end mouth 6.

If the valve 1 is used as a filling valve, displacement of shutter 8 into its open position directly produces filling of the respective receptacle.

The advantages of valve 1 according to the present invention will be clear from the foregoing description.

In particular, thanks to the flat configuration of main body 20 of shutter 8, valve 1 allows to maximise the passage section in channel 3 for the solid particles of sizes up to e.g. 6-12 mm or even larger contained in the pourable product without any undesired reduction of the magnetic attraction force produced on the shutter 8 itself by the magnets 26a of movable member 27. Thereby, the valve 1 according to the present invention allows to increase the control on particles integrity and to considerably reduce the occurrence of obstructions, even partial ones, thus limiting accordingly the need for maintenance intervention and, as a consequence, down times.

The increased passage section within channel 3 also allows to maximize the cleaning efficiency of the inner parts of valve 1 by using a cleaning medium flowing within the channel 3 itself in an opposite direction to that of the pourable product during dosing and/or filling.

Clearly, changes may be made to valve 1 as described herein without, however, departing from the scope of protection as defined in the accompanying claims.

The invention claimed is:

1. A flow control valve for a filling machine configured to fill receptacles with a pourable product, the flow control valve comprising:
   a tubular body defining a channel for receiving the pourable product, the tubular body having a longitudinal axis and defining:
      a first end portion terminating with a first narrowed end mouth connectable to a tank; and
      a second end portion located at an opposite end of the tubular body with respect to the first end portion and terminating with a second narrowed end mouth connectable to a receptacle to be filled;
   a shutter movable within the channel between a closed position, in which the shutter sealingly closes the second narrowed end mouth and interrupts flowing of the pourable product, and an open position, in which a gap is established between the shutter and the second narrowed end mouth so as to allow flowing of the pourable product through the second narrowed end mouth, the shutter including:
      a main portion coupled in a sliding manner with an inner surface of the tubular body; and
      a narrowed closing head axially protruding from the main portion and configured to cooperate in a fluid-tight manner with the second narrowed end mouth in the closed position of the shutter,
      wherein the main portion of the shutter includes a flat plate extending along a diameter of the channel with respect to the longitudinal axis, contacting the inner surface of the tubular body at opposite sides and defining, with the remaining portions of the inner surface, two opposite cavities, which have respective profiles shaped as circular segments and through which the pourable product can flow during operation;

a first magnetic device, carried by the opposite sides of the plate of the shutter;

at least two second magnetic devices arranged diametrically opposite to each other and extending along an arc of circumference externally of the tubular body;

a movable member carrying the second magnetic devices; and a driving actuator configured to displace the movable member and the shutter by magnetic attraction along the longitudinal axis, wherein:

the second magnetic devices are magnetically coupled to the first magnetic device at the opposite sides of the plate of the shutter, the second magnetic devices are configured to be selectively activated to move the first magnetic device and the shutter by magnetic attraction along the longitudinal axis between the open and closed positions, the channel, the first narrowed end mouth, and the gap established between the shutter and the first narrowed end mouth with the shutter in an open position, are together configured to allow free flow of pourable product therethrough containing solid particles having lengths of at least 6-12 mm, the second end portion of the tubular body defines an auxiliary port, the auxiliary port extending radially with respect to the channel to receive the pourable product and being located upstream of the second narrowed end mouth with respect to the flow of pourable product through the channel from the first narrowed end mouth to the second narrowed end mouth, and the auxiliary port is connectable to a dosing actuator, the dosing actuator being configured to suck a desired volume of the pourable product from the tank through the auxiliary port when the shutter is in the open position spaced from the first narrowed end mouth to allow free flow of the pourable product from the tank into the channel, and the dosing actuator being configured to feed the desired volume of the pourable product into the receptacle after displacement of the shutter into the closed position in fluid-tight engagement with the second narrowed end mouth.

2. The flow control valve as claimed in claim 1, wherein:
the first magnetic device includes at least two first permanent-magnet units located at diametrically opposite positions on the plate of the shutter with respect to the longitudinal axis;
the at least two second magnetic devices each include a plurality of second permanent-magnet units arranged along the arc of circumference at the opposite sides of the plate of the shutter, the plurality of second permanent-magnet units facing one respective first permanent-magnet unit of the plate of the shutter during operation; and
each of the first and second permanent-magnet units are arranged adjacent to one another with identical magnetic poles facing axially.

3. The flow control valve as claimed in claim 1, wherein the movable member is coaxially coupled in a sliding manner onto an outer surface of the tubular body.

4. The flow control valve as claimed in claim 1, wherein the channel has a passage section configured to allow cleaning medium to flow, during cleaning, in an opposite direction to the direction of flow of the pourable product through the channel from the first narrowed end mouth to the second narrowed end mouth.

5. The flow control valve as claimed in claim 1, further comprising a frustum-conical transition region interposed between the channel and the second narrowed end mouth, wherein the frustum-conical transition region is tapered towards the second narrowed end mouth.

6. The flow control valve as claimed in claim 1, wherein:
the narrowed closing head further comprises a conical surface corresponding to a surface of the tubular body; and
the conical surface is configured to cooperate in use with the surface of the tubular body to sealingly close flow of the pourable product.

7. The flow control valve as claimed in claim 6, wherein the narrowed closing head further comprises an annular gasket mounted onto the conical surface.

8. The flow control valve as claimed in claim 2, wherein the second permanent-magnet units further comprise a cylindrical casing configured to internally house permanent magnets.

9. The flow control valve as claimed in claim 3, wherein:
the movable member comprises two annular plates mounted in a sliding manner onto the outer surface of the tubular body; and
the annular plates are connected to each other by the second permanent-magnet units.

10. The flow control valve as claimed in claim 1, wherein the driving actuator comprises:
a fixed casing externally secured onto the tubular body; and
a piston comprising a first end movable within the casing and a second end extending outside the casing and connected to the movable member.

11. The flow control valve as claimed in claim 10, further comprising:
a first frame projecting upwards from the tubular body and configured to connect the casing to the tubular body; and
a second frame projecting upwards from an upper annular plate of the movable member and configured to connect the piston to the movable member.

12. A flow control valve for a filling machine configured to fill receptacles with a pourable product, the flow control valve comprising:
a tubular body defining a channel for receiving the pourable product, the tubular body having a longitudinal axis and defining:
a first end portion terminating with a first narrowed end mouth connectable to a tank; and
a second end portion located at an opposite end of the tubular body with respect to the first end portion and terminating with a second narrowed end mouth connectable to a receptacle to be filled;
a shutter movable within the channel between a closed position, in which the shutter sealingly closes the second narrowed end mouth and interrupts flowing of the pourable product, and an open position, in which a gap is established between the shutter and the second narrowed end mouth so as to allow flowing of the pourable product through the second narrowed end mouth, the shutter including:
a main portion coupled in a sliding manner with an inner surface of the tubular body; and
a narrowed closing head axially protruding from the main portion and configured to cooperate in a fluid-tight manner with the second narrowed end mouth in the closed position of the shutter,
wherein the main portion of the shutter includes a flat plate extending along a diameter of the channel with respect to the longitudinal axis, contacting the inner surface of the tubular body at opposite sides and defining, with the remaining portions of the inner surface, two opposite cavities, which have respective profiles shaped as circular segments and through which the pourable product can flow during operation;
a first magnetic device, carried by the opposite sides of the plate of the shutter;
at least two second magnetic devices arranged diametrically opposite to each other and extending along an arc of circumference externally of the tubular body;
a movable member carrying the second magnetic devices; and
a driving actuator configured to displace the movable member and the shutter by magnetic attraction along the longitudinal axis, wherein:
the second magnetic devices are magnetically coupled to the first magnetic device at the opposite sides of the plate of the shutter,
the second magnetic devices are configured to be selectively activated to move the first magnetic device and the shutter by magnetic attraction along the longitudinal axis between the open and closed positions,
the channel, the first narrowed end mouth, and the gap established between the shutter and the first narrowed end mouth with the shutter in an open position, are together configured to allow free flow of pourable product therethrough containing solid particles,
the second end portion of the tubular body defines an auxiliary port, the auxiliary port extending radially with respect to the channel to receive the pourable product and being located upstream of the second narrowed end mouth with respect to the flow of pourable product through the channel from the first narrowed end mouth to the second narrowed end mouth, and
the auxiliary port is connectable to a dosing actuator, the dosing actuator being configured to suck a desired volume of the pourable product from the tank through the auxiliary port when the shutter is in the open position spaced from the first narrowed end mouth to allow free flow of the pourable product from the tank into the channel, and the dosing actuator being configured to feed the desired volume of the pourable product into the receptacle after displacement of the shutter into the closed position in fluid-tight engagement with the second narrowed end mouth.

13. The flow control valve as claimed in claim 12, wherein:
the first magnetic device includes at least two first permanent-magnet units located at diametrically opposite positions on the plate of the shutter with respect to the longitudinal axis;
the at least two second magnetic devices each include a plurality of second permanent-magnet units arranged along the arc of circumference at the opposite sides of the plate of the shutter, the plurality of second permanent-magnet units facing one respective first permanent-magnet unit of the plate of the shutter during operation; and
each of the first and second permanent-magnet units are arranged adjacent to one another with identical magnetic poles facing axially.

14. The flow control valve as claimed in claim 12, wherein the channel has a passage section configured to allow cleaning medium to flow, during cleaning, in an opposite direction to the direction of flow of the pourable product through the channel from the first narrowed end mouth to the second narrowed end mouth.

15. The flow control valve as claimed in claim 12, wherein the driving actuator comprises:
a fixed casing externally secured onto the tubular body; and
a piston comprising a first end movable within the casing and a second end extending outside the casing and connected to the movable member.

* * * * *